US010812843B2

(12) United States Patent
Jones et al.

(10) Patent No.: US 10,812,843 B2
(45) Date of Patent: *Oct. 20, 2020

(54) METHOD AND APPARATUS FOR ENCODING VIDEO STREAMS

(71) Applicant: AT&T Intellectual Property I, L.P., Atlanta, GA (US)

(72) Inventors: Todd W. Jones, Kansas City, MO (US); Jeffrey W. Zimmerman, Lenexa, KS (US); Daniel J. Hipps, Platte City, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,677

(22) Filed: Jan. 4, 2019

(65) Prior Publication Data

US 2019/0141370 A1    May 9, 2019

Related U.S. Application Data

(60) Continuation of application No. 15/058,467, filed on Mar. 2, 2016, now Pat. No. 10,194,179, which is a continuation of application No. 13/418,393, filed on Mar. 13, 2012, now Pat. No. 9,313,459, which is a division of application No. 12/132,093, filed on Jun. 3, 2008, now Pat. No. 8,160,133.

(51) Int. Cl.
*H04N 21/236* (2011.01)
*H04N 21/2389* (2011.01)
(Continued)

(52) U.S. Cl.
CPC ... *H04N 21/23614* (2013.01); *H04N 7/17318* (2013.01); *H04N 21/2389* (2013.01);
(Continued)

(58) Field of Classification Search
CPC ......... H04N 21/23614; H04N 7/17318; H04N 21/2389; H04N 21/4385; H04N 21/6405; H04N 21/84
See application file for complete search history.

(56) References Cited

U.S. PATENT DOCUMENTS 6,175,387 B1    1/2001  Han
7,913,277 B1 *  3/2011  Rahrer .......... H04N 21/234309
                                                725/114
(Continued)

FOREIGN PATENT DOCUMENTS

KR            100311009 B       9/2001

*Primary Examiner* — Brenda H Pham
(74) *Attorney, Agent, or Firm* — Guntin & Gust, PLC; Robert Gingher

(57) ABSTRACT

A system that incorporates teachings of the present disclosure may include, for example, an encoder having a controller adapted to receive a digital video stream with metadata, retrieve from at least a portion of the metadata a native video format, configure encoding of at least a portion of the digital video stream according to the retrieved native video format, generate from at least the portion of the digital video stream an encoded video stream conforming to a moving picture experts group format and the native video format, and submit the encoded video stream to an acquisition server for multicast distribution. Other embodiments are disclosed.

19 Claims, 6 Drawing Sheets

(51) Int. Cl.
  *H04N 21/4385* (2011.01)
  *H04N 21/61* (2011.01)
  *H04N 21/6405* (2011.01)
  *H04N 21/647* (2011.01)
  *H04N 21/658* (2011.01)
  *H04N 21/84* (2011.01)
  *H04N 7/173* (2011.01)

(52) U.S. Cl.
  CPC ..... *H04N 21/4385* (2013.01); *H04N 21/6125* (2013.01); *H04N 21/6405* (2013.01); *H04N 21/64784* (2013.01); *H04N 21/6581* (2013.01); *H04N 21/84* (2013.01)

(56) References Cited

U.S. PATENT DOCUMENTS

| | | | |
|---|---|---|---|
| 7,936,876 B2 | | 5/2011 | Walker |
| 8,041,186 B1 | | 10/2011 | Black |
| 8,054,849 B2 | * | 11/2011 | Nadarajah ............ H04L 12/185 370/217 |
| 8,160,133 B2 | * | 4/2012 | Jones ................ H04N 7/17318 375/240.01 |
| 9,313,459 B2 | * | 4/2016 | Jones ................ H04N 7/17318 |
| 10,194,179 B2 | * | 1/2019 | Jones ................ H04N 7/17318 |
| 2002/0083468 A1 | | 6/2002 | Dudkiewicz |
| 2005/0008347 A1 | * | 1/2005 | Jung ................ H04N 5/44508 386/230 |
| 2005/0024532 A1 | | 2/2005 | Choi |
| 2009/0180763 A1 | | 7/2009 | McCarthy et al. |
| 2016/0182926 A1 | | 6/2016 | Jones et al. |

\* cited by examiner

200

METHOD AND APPARATUS FOR ENCODING VIDEO STREAMS

CROSS-REFERENCE TO RELATED APPLICATIONS

This application is a continuation of U.S. patent application Ser. No. 15/058,467 filed Mar. 2, 2016, which is a continuation of U.S. patent application Ser. No. 13/418,393 filed Mar. 13, 2012 (now U.S. Pat. No. 9,313,459), which is a divisional of U.S. patent application Ser. No. 12/132,093 filed Jun. 3, 2008 (now U.S. Pat. No. 8,160,133). All sections of the aforementioned applications are incorporated herein by reference in their entirety.

FIELD OF THE DISCLOSURE

The present disclosure relates generally to encoding techniques and more specifically to a method and apparatus for encoding video streams.

BACKGROUND

In Internet Protocol-based media communication systems it is common to transmit media programs from a collection point such as a Super Headend Office, and then distribute the collection of programs in media streams which are encoded at intermediate points, and distributed to Video Headend Offices which then multicast the programs to targeted end points such as Set-Top Boxes (STBs). An STB in turn presents a video program on a display according to the video format associated with the program and the resolution and aspect ratio capabilities of the display.

Suppliers of video programs can supply video content in Standard-Definition Television format, High-Definition Television (HDTV) format, or variants thereof. For example a supplier can offer programming content in one version of an HDTV format (e.g., 720 interlaced scanning format or 720i), while advertisers supplying advertisement content intermixed with the program provide content in another version of HDTV format (e.g., 1080i).

DETAILED DESCRIPTION

One embodiment of the present disclosure entails an encoder having a controller adapted to receive a Digital Video (DV) stream with metadata, retrieve from at least a portion of the metadata a native video format, configure encoding of at least a portion of the DV stream according to the retrieved native video format, generate from at least the portion of the DV stream an encoded video stream conforming to a moving picture experts group format and the native video format, and submit the encoded video stream to an Acquisition server for multicast distribution.

Another embodiment of the present disclosure entails a computer-readable storage medium operating in an encoder having computer instructions for receiving a DV stream with metadata, identifying a video format from at least a portion of the metadata, generating from at least a portion of the DV stream an encoded stream encoded according to an H.264 format and the video format, and transmitting the encoded stream to a video headend office.

Yet another embodiment of the present disclosure entails a method involving retrieving a native video format from a DV stream for configuring an encoding of at least a portion of the DV stream to the native video format.

Figure 1:
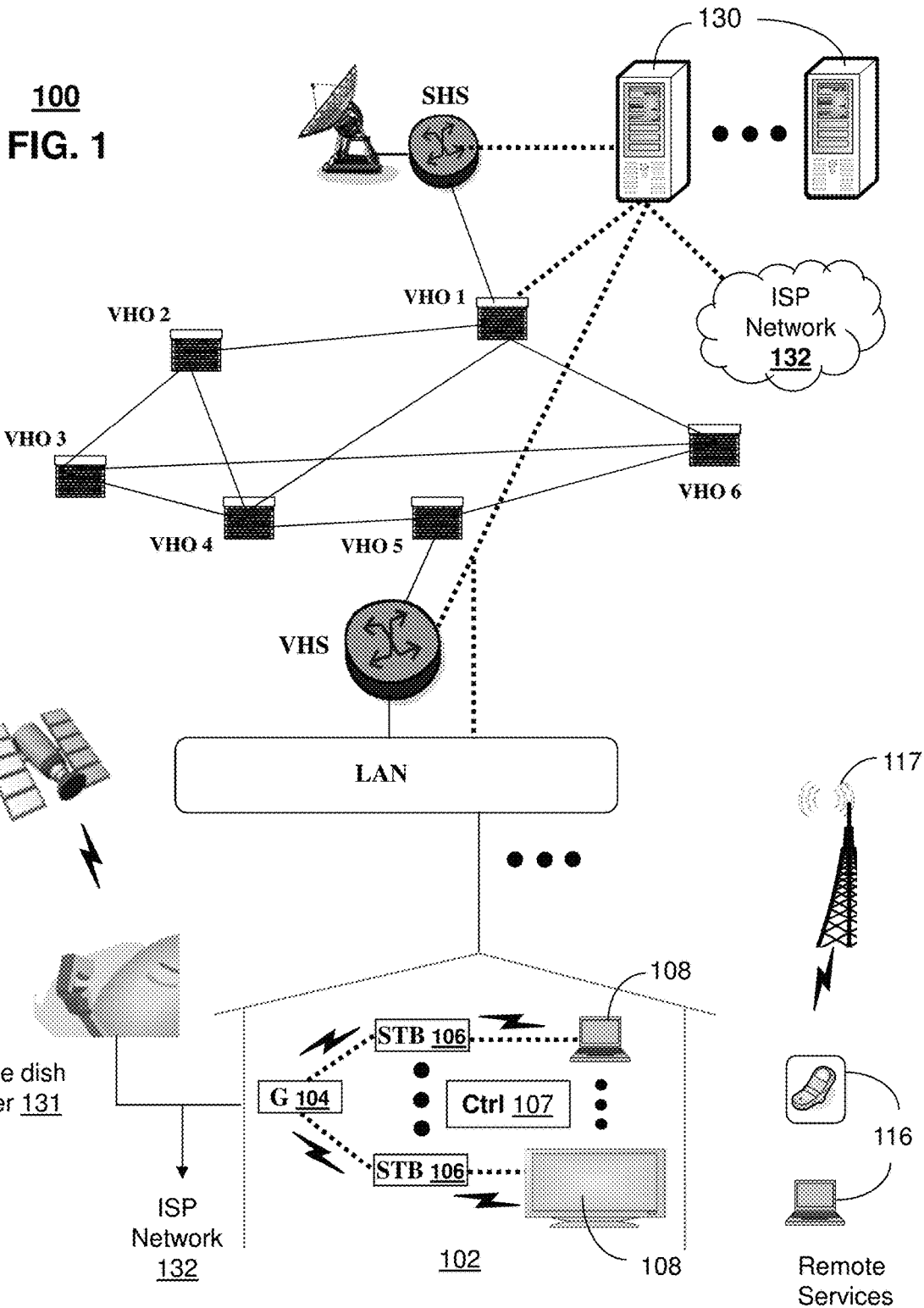
FIGS. 1-3 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
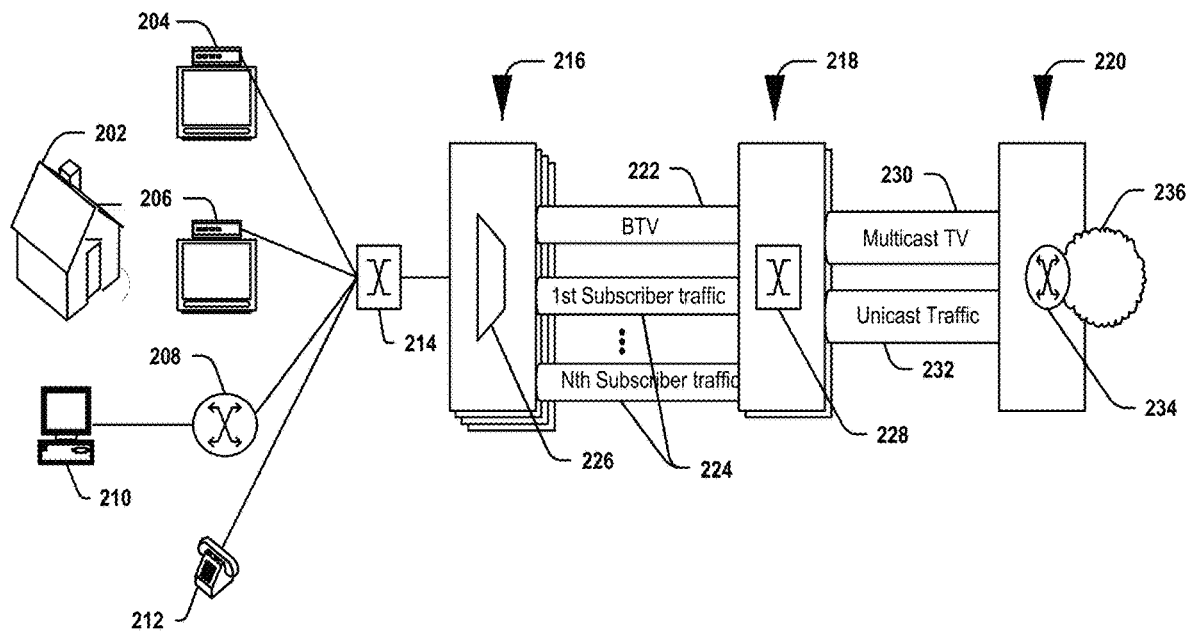

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
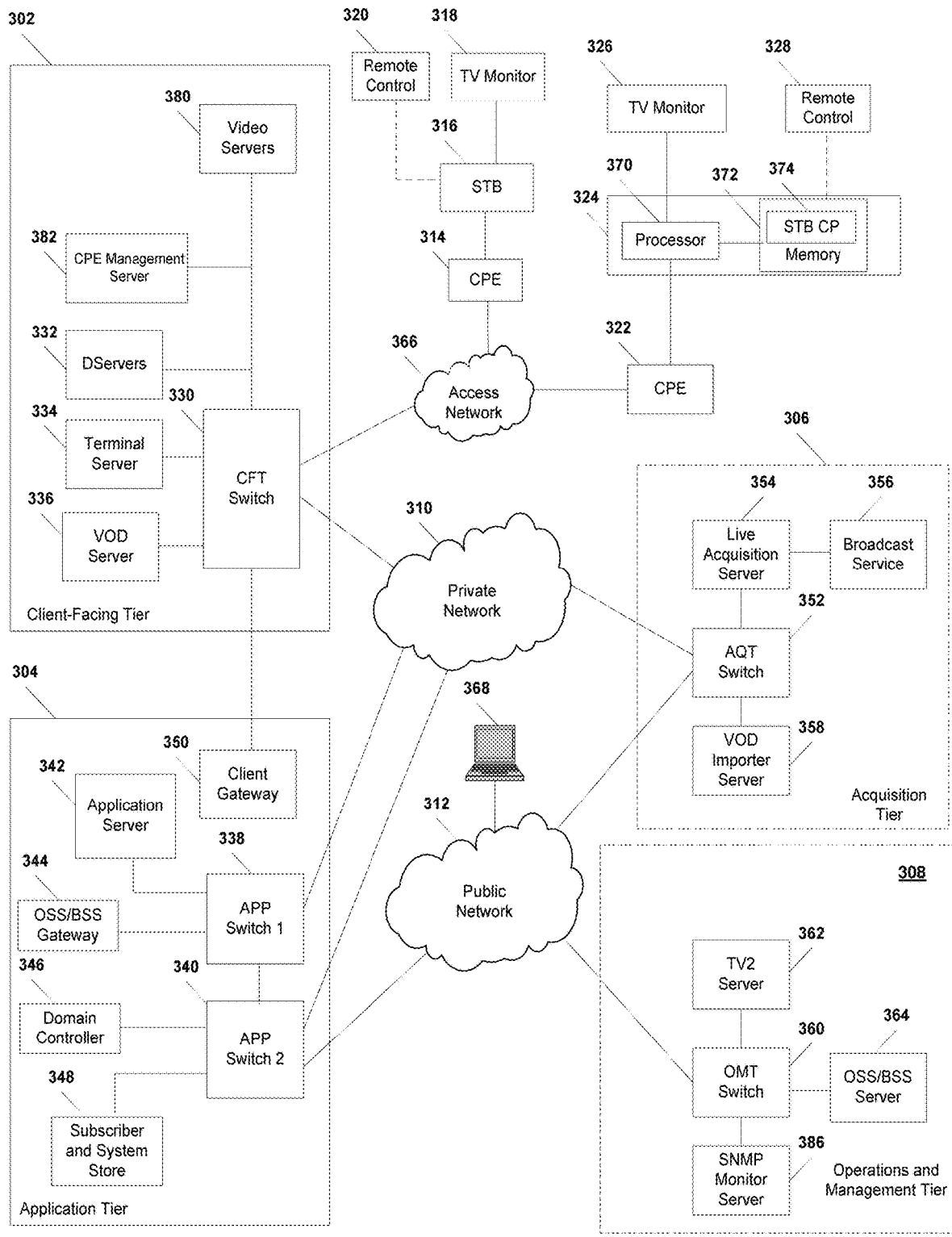

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
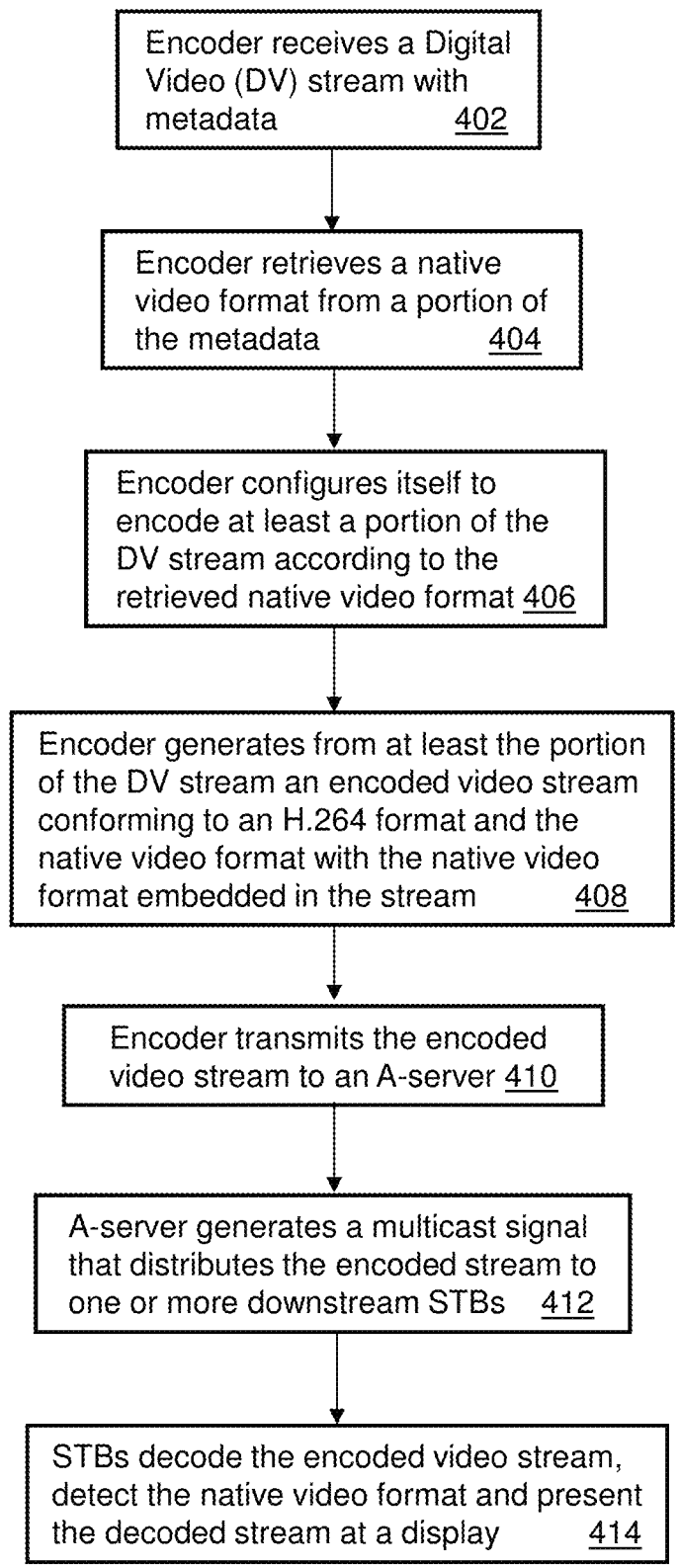
FIG. 4 depicts an exemplary method operating in portions of the communication systems of FIGS. 1-3.
Figure 5:
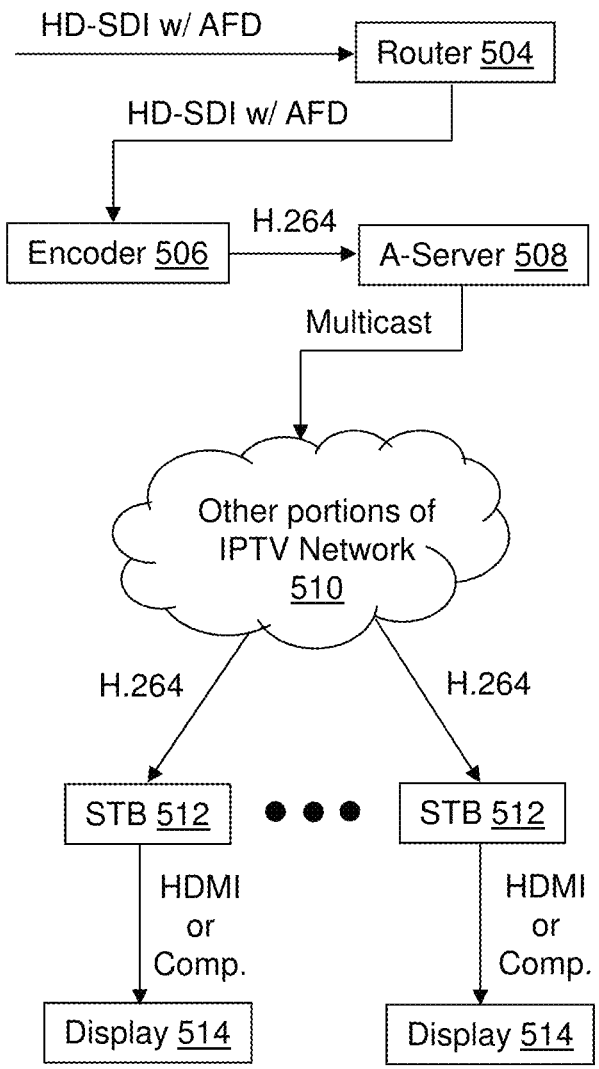
FIG. 5 depicts an exemplary portion of the communication systems of FIGS. 1-3.

FIG. 4 depicts an exemplary method 400 operating in portions of communication systems 100-300. FIG. 5 depicts an exemplary portion of the communication systems of FIGS. 1-3 which can be used to illustrate method 400. Method 400 begins with step 402 in which an encoder 506 receives from a router 504 a Digital Video (DV) stream illustratively shown as a High Definition Serial Digital Interface (HD-SDI) stream with embedded metadata. The encoder can represent an MPEG-4 Advanced Video Codec (AVC) encoder adapted to method 400. The MPEG-4 AVC encoder can encode HD-SDI streams into H.264 or MPEG-4 streams. The HD-SDI stream can conform to the Society of Motion Picture and Television Engineers (SMPTE) 292M standard.

A portion of the metadata delivered by the DV stream can be located in an Active Format Descriptor (AFD) field of the HD-SDI stream. The metadata of the AFD field describes a native video format for at least a portion of the HD-SDI stream. The native video format can describe a resolution format and an aspect ratio format of one or more media programs in the HD-SDI stream. Common resolution formats and aspect ratios that can be defined in the native video format can include 1080, 720, 576, and 480 progressive scanning or interlaced scanning formats, and 1.85:1, 2.39: 1, 3:2, 4:3, or 16:9 aspect ratios.

In step 404, the encoder 506 can retrieve the native video format from the metadata of the AFD field. The encoder 506 can then configure itself in step 406 to encode at least a portion of the HD-SDI stream according to the retrieved native video format and the MPEG-4 format. Once configured, the encoder 506 generates in step 408 from at least the portion of the HD-SDI stream of interest an encoded video stream conforming to the H.264 format and the native video format. In this step, the encoder 506 can also insert the AFD field (or a representation thereof) in the encoded video stream for utilization by a downstream media device. In step 410, the encoder 505 transmits the encoded video stream to an A-server 508 which in step 412 generates a multicast signal that distributes the encoded stream to one or more downstream STBs 512 by way of other portions of the IPTV network 510. The STBs 512 can then decode the encoded video stream in step 414 detecting in part the native video format. With this information, the STB 512 presents at a corresponding display 514 coupled thereto the decoded stream according to its native video format.

Method 400 is repeated as the native video format changes in the DV streams received by the encoder 506. Accordingly, the encoder 506 automatically adapts its encoding algorithm to the native video format of the received stream with minimal or no manual intervention, which reduces human error and saves the service provider of communication systems 100-300 considerable cost. Method 400 can be applied in any portion of the communication systems 100-300 where video encoding can take place (e.g., SHO, VHO, etc.).

Upon reviewing the aforementioned embodiments, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 6:
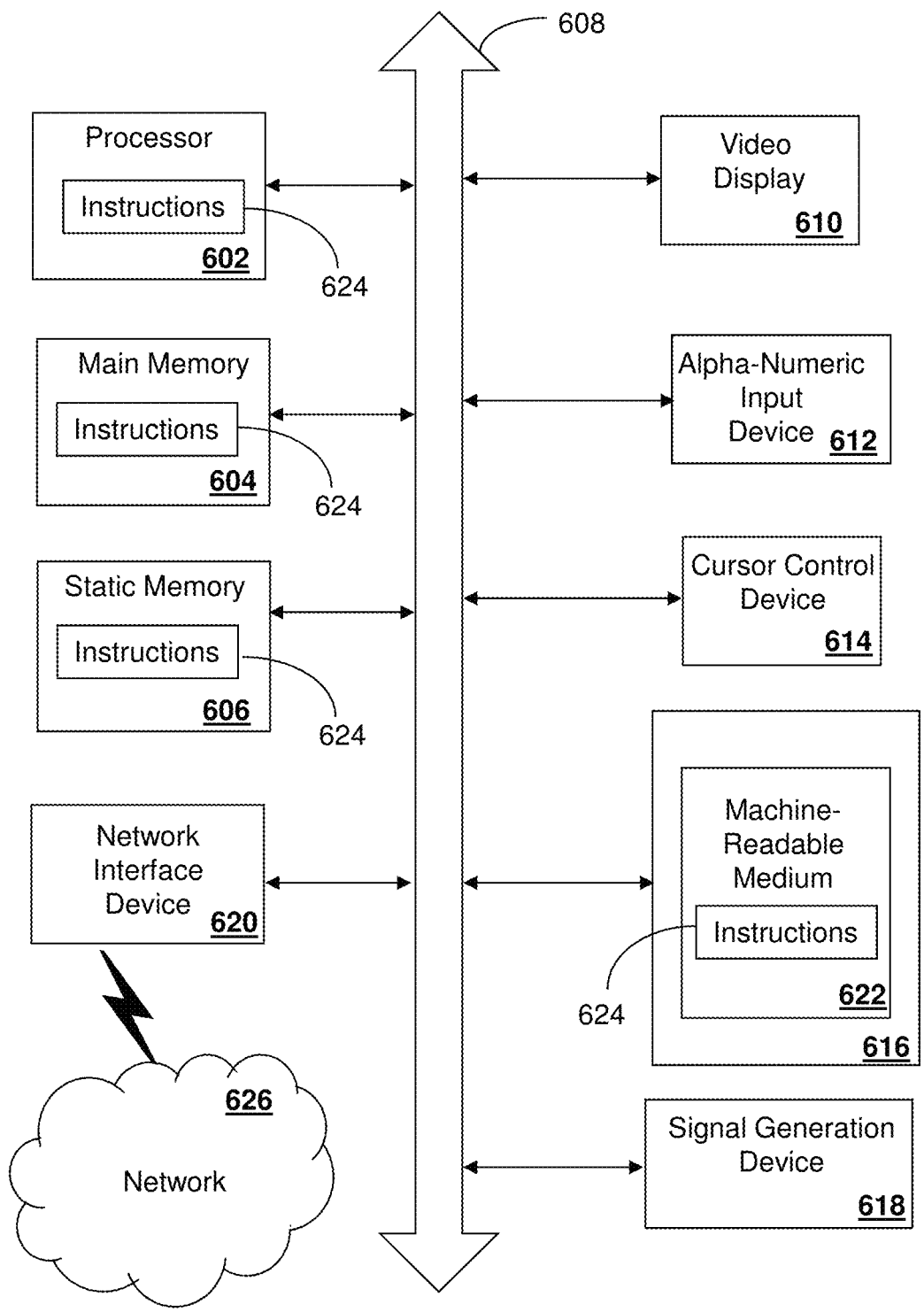
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers)

that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   identifying, by a processing system including a processor, a current native video format of a current portion of a digital video stream according to a first indication of the current native video format in a first active format descriptor of the digital video stream;
   automatically adjusting, by the processing system, an encoding algorithm according to the identified current native video format;
   automatically encoding utilizing the encoding algorithm, by the processing system, a portion of the digital video stream according to the current native video format of the current portion of the digital video stream to generate an encoded video stream from the portion of the digital video stream conforming to a moving picture experts group format and the current native video format;
   inserting, by the processing system, an indication of the current native video format in a second active format descriptor of the encoded video stream;
   sending, by the processing system, the encoded video stream to an acquisition server for multicast distribution as a multicast stream to media processors that decode the multicast stream according to the indication of the current native video format of the second active format descriptor;
   identifying, by the processing system, another current native video format of another current portion of another digital video stream according to another indication of the another current native video format in a third active format descriptor of the another digital video stream; and
   automatically re-adjusting, by the processing system, the encoding algorithm according to the identified another current native video format.

2. The method of claim 1, wherein the current native video format comprises a high-definition television format, and wherein the digital video stream comprises a dual link high definition serial digital interface stream.

3. The method of claim 1, wherein the current native video format comprises one of a standard definition television format or a high definition television format.

4. The method of claim 1, wherein the digital video stream comprises one of a serial digital interface stream, a high definition serial digital interface stream, a dual link high definition serial digital interface stream, or combinations thereof.

5. The method of claim 4, wherein the serial digital interface stream conforms to a society of motion picture and television engineers 259M standard, wherein the high definition serial digital interface stream conforms to the society of motion picture and television engineers 292M standard, and wherein the dual link high definition serial digital interface stream conforms to the society of motion picture and television engineers 372M standard.

6. The method of claim 1, further comprising automatically encoding utilizing the encoding algorithm, by the processing system, the another current portion of the digital video stream according to the another current native video format to generate an another encoded video stream conforming to the moving picture experts group format and the another current native video format.

7. The method of claim 1, wherein the current native video format comprises a resolution format and an aspect ratio format.

8. An apparatus, comprising:
a processing system including a processor; and
a memory that stores executable instructions that, when executed by the processing system, facilitate performance of operations, comprising:
automatically encoding a portion of a digital video stream according to a current native video format of a current portion of the digital video stream to generate an encoded video stream conforming to a moving picture experts group format and the current native video format;
inserting a second indication of the current native video format in a second active format descriptor of the encoded video stream, wherein the second active format descriptor comprises a resolution format and an aspect ratio format, and wherein the resolution format comprises one of 1080, 720, 576, and 480 progressive scanning or interlaced scanning formats, and wherein the aspect ratio format comprises one of 1.85:1, 2.39: 1, 3:2, 4:3, or 16:9 aspect ratios; and
sending the encoded video stream to an acquisition server for multicast distribution.

9. The apparatus of claim 8, wherein the current native video format is determined from a first active format descriptor field of the digital video stream.

10. The apparatus of claim 8, wherein the current native video format comprises one of a Standard-Definition television format or a high definition television format.

11. The apparatus of claim 8, wherein the encoding is performed in an internet protocol television communication system.

12. The apparatus of claim 8, wherein the digital video stream comprises one of a serial digital interface stream, a high definition serial digital interface stream, or a dual link high definition serial digital interface stream.

13. The apparatus of claim 12, wherein the serial digital interface stream conforms to a society of motion picture and television engineers 259M standard, and wherein the high definition serial digital interface stream conforms to the society of motion picture and television engineers 292M standard.

14. The apparatus of claim 12, wherein the dual link high definition serial digital interface stream conforms to a society of motion picture and television engineers 372M standard.

15. A non-transitory, machine-readable storage medium, comprising executable instructions that, when executed by a processing system including a processor, facilitate performance of operations, comprising:
encoding a portion of a digital video stream according to a first format to generate an encoded video stream conforming to a second format and the first format, wherein the encoding is performed automatically;
retrieving information from metadata in the digital video stream, wherein the information is included in the digital video stream and is associated with a current native video format in a first active format descriptor field of the digital video stream, wherein the first format comprises the current native video format;
inserting an indication of the first format in a second active format descriptor of the encoded video stream; and
sending the encoded video stream for multicast distribution.

16. The non-transitory, machine-readable storage medium of claim 15, wherein the current native video format comprises one of a Standard-Definition television format or a high definition television format.

17. The non-transitory, machine-readable storage medium of claim 15, wherein the second format is a moving picture experts group format.

18. The non-transitory, machine-readable storage medium of claim 15, wherein the digital video stream comprises one of a serial digital interface stream, a high definition serial digital interface stream, or a dual link high definition serial digital interface stream.

19. The non-transitory, machine-readable storage medium of claim 15, wherein the second active format descriptor comprises a resolution format and an aspect ratio format, and wherein the resolution format comprises one of 1080, 720, 576, and 480 progressive scanning or interlaced scanning formats, and wherein the aspect ratio format comprises one of 1.85:1, 2.39:

1, 3:2, 4:3, or 16:9 aspect ratios.

* * * * *